US012670190B1

(12) United States Patent
Nie et al.

(10) Patent No.: US 12,670,190 B1
(45) Date of Patent: Jun. 30, 2026

(54) RETRIEVAL OPTIMIZATION METHOD BASED ON MULTI-LEVEL KNOWLEDGE BASE, MEDIUM, AND SYSTEM

(71) Applicant: Hunan Agricultural University, Changsha (CN)

(72) Inventors: Xiaoyi Nie, Changsha (CN); Xinghui Zhu, Changsha (CN); Zhongsong Liu, Changsha (CN); Xiaoyu Li, Changsha (CN); Yi Zhang, Changsha (CN); Haitao Zhang, Changsha (CN)

(73) Assignee: Hunan Agricultural University, Changsha (CN)

( * ) Notice: Subject to any disclaimer, the term of this patent is extended or adjusted under 35 U.S.C. 154(b) by 0 days.

(21) Appl. No.: 19/309,522

(22) Filed: Aug. 25, 2025

(30) Foreign Application Priority Data

Jan. 20, 2025 (CN) ........................ 202510082760.X

(51) Int. Cl.
G06F 16/332 (2025.01)
(52) U.S. Cl.
CPC ................................ G06F 16/3325 (2019.01)
(58) Field of Classification Search
CPC .................................................. G06F 16/3325
See application file for complete search history.

(56) References Cited

U.S. PATENT DOCUMENTS

| 7,562,069 B1 * | 7/2009 | Chowdhury | ....... G06Q 30/0601 |
| 2021/0027146 A1 * | 1/2021 | Xu | ..................... G06Q 30/0201 |
| 2022/0249910 A1 * | 8/2022 | Hu | ......................... G16H 20/30 |

FOREIGN PATENT DOCUMENTS

| CN | 118113836 A | 5/2024 | |
| CN | 119494411 A | * 2/2025 | ......... G06F 16/3347 |
| WO | WO-2019057192 A1 | * 3/2019 | ......... G06F 16/6024 |

OTHER PUBLICATIONS

Wang Qiuyue, Computer Application, vol. 36, Issue 04,Apr. 10, 2016, pp. 985-991.

* cited by examiner

*Primary Examiner* — Amanda L Willis
(74) *Attorney, Agent, or Firm* — Birchwood IP

(57) ABSTRACT

Provided are a retrieval optimization method based on a multi-level knowledge base, a medium, and a system. The method includes: hierarchically managing knowledge data to construct a multi-level knowledge base; retrieving the multi-level knowledge base according to a user query to generate an initial vector chunk set; then performing first query rewriting on the query and retrieving the multi-level knowledge base again to generate an updated vector chunk set. The strong and weak direction positioning of this retrieval can generate query questions that are both professional and comprehensive.

7 Claims, 3 Drawing Sheets

RETRIEVAL OPTIMIZATION METHOD BASED ON MULTI-LEVEL KNOWLEDGE BASE, MEDIUM, AND SYSTEM

CROSS-REFERENCE TO RELATED APPLICATIONS

This application claims priority to Chinese Patent Application No. 202510082760.X, filed on Jan. 20, 2025, which is hereby incorporated by reference in its entirety.

TECHNICAL FIELD

The present application relates to the field of large language model processing, and in particular, to a retrieval optimization method based on a multi-level knowledge base, a medium, and a system.

BACKGROUND

In the application of retrieval-augmented generation (RAG), natural language-based question-and-answer interaction has become the mainstream approach for users. However, due to the colloquial expressions, vague descriptions and ambiguous contextual references of user queries, RAG systems often struggle to accurately understand user intentions, resulting in inaccurate retrieval results and generated answers that fail to meet requirements of the users. This limitation becomes particularly pronounced in complex tasks requiring multi-turn information integration, in-depth analysis, or domain-specific expertise. To address this limitation, query rewriting techniques have been widely adopted. These techniques aim to optimize and semantically refine user queries, so as to eliminate ambiguities and clarify information needs. However, existing methods typically perform only single-turn query rewriting, failing to fully capture the multi-level characteristics of user semantics or balance the professionalism and comprehensiveness of queries across multiple dimensions.

Therefore, how to optimize the diversity and professionalism of answers and improve the correlation between retrieval results through multi-turn precise query rewriting has become a key challenge that needs to be resolved urgently.

SUMMARY

To resolve at least one of the foregoing technical problems, an embodiment of the present application provides a retrieval optimization method based on a multi-level knowledge base, where the method includes:

S1: hierarchically managing knowledge data to construct a multi-level knowledge base;

S2: retrieving the multi-level knowledge base according to a user query to generate an initial vector chunk set; then performing first query rewriting on the query and retrieving the multi-level knowledge base again to generate an updated vector chunk set;

S3: determining retrieval strength and weakness directions according to statistical results of sources of the initial vector chunk set and the updated vector chunk set in a multi-level data chunk; and S4: performing second query rewriting on the query according to the retrieval strength and weakness directions, and outputting a query question.

Further, the step S3 includes:

S31: determining source positions of vector chunks from the initial vector chunk set and the updated vector chunk set in the multi-level knowledge base;

S32: counting a number of vector chunks included at the source positions; and

S33: sorting statistical results to determine the retrieval strength and weakness directions.

Further, the step S33 includes:

S331: determining a position coefficient at each of the source positions according to the number of vector chunks included at the source positions; and S332: if the position coefficient is greater than a first set threshold or a ranking of the position coefficient is within a first set rank, determining the position coefficient as a strong retrieval direction; otherwise, determining the position coefficient as a weak retrieval direction.

Further, the step S332 further includes:

determining whether a position coefficient at a source position determined to be in the weak direction is less than a second set threshold or whether a ranking of the position coefficient is greater than a second set rank, if yes, screening out a source position corresponding to the position coefficient; where the second set threshold is less than the first set threshold; and the second set rank is greater than the first set rank.

Further, the step S31 further includes:

S31a: comparing the initial vector chunk set with the updated vector chunk set to determine an identical vector chunk and different vector chunks;

S31b: configuring a higher number coefficient for the identical vector chunk than for the different vector chunks;

the step S32 specifically includes: counting a number of vector chunks included in the source positions based on a weight according to the number coefficient.

Further, the step S331 includes:

S3311: in the multi-level knowledge base, determining a position coefficient at each of the source positions on a first level according to a number of vector chunks included at the source positions on the first level; and S3312: for each of source positions at a level other than the first level, determining a position coefficient at the source position at the level other than the first level according to a number of vector chunks included at the source position and position coefficients of superior levels of the source position.

Further, the step S3312 further includes:

S33121: for the source position at the level other than the first level, counting a sum of a number of vector chunks included in the same level;

S33122: determining a level coefficient at the source position according to a ratio of the number of vector chunks included at the source position to the sum of the number of vector chunks included at the same level; and S33123: determining the position coefficient at the source position at the level other than the first level according to the number of vector chunks included in the source position and the position coefficients of superior levels of the source position as well as the level coefficient at the source position.

Further, the method further includes:

P1: optimizing the query question by adopting the foregoing retrieval optimization method;

P2: determining a weight of the multi-level knowledge base according to the retrieval strength and weakness directions determined in any of the retrieval optimization methods; and P3: generating a final vector chunk set according to the optimized query question and the multi-level knowledge base set by the weight.

According to a second aspect, an embodiment of the present application provides a computer-readable storage medium. The computer-readable storage medium stores a computer program, and when the computer program is executed by a processor, the foregoing method is implemented.

According to a third aspect, an embodiment of the present application provides an electronic system, including a memory, a processor, and a computer program that is stored in the memory and that may be run on the processor. When the processor executes the computer program, the foregoing method is implemented.

Compared with the conventional technology, embodiments of the present application have the following beneficial effect.

According to the retrieval optimization method based on the multi-level knowledge base, the medium, and the system provided by the present application, the initial vector chunk sets and the updated vector chunk sets of the two retrievals are counted, duplicate and independent knowledge bases are identified, the retrieval strength and weakness directions are determined, the second query rewriting is performed on the query, and more accurate query questions are output. In one aspect, for the strong direction determined by the retrieval, it is determined which knowledge base the retrieval result repeatedly comes from, not all the knowledge bases are treated uniformly, and the specialty of the query question may be considered. In another aspect, for the weak direction determined by the retrieval, it is determined which knowledge base the retrieval result comes from independently, rather than discarding the retrieval result directly, and the comprehensiveness of the query question may be considered. Therefore, the strong and weak direction positioning of the retrieval preferably adjusts the focus of the retrieval and the weight of the knowledge base, which can generate query questions that are both professional and comprehensive. Through two rounds of optimization, this method significantly reduces query ambiguity and enhances the accuracy and diversity of generated content, providing a more efficient and accurate solution for the application of RAG systems in complex tasks.

BRIEF DESCRIPTION OF THE DRAWINGS

To describe the technical solutions in embodiments of the present application more clearly, the following briefly describes the accompanying drawings used in describing embodiments or the conventional technology. It is clear that the accompanying drawings in the following descriptions show some embodiments of the present application, and those of ordinary skill in the art may still derive other drawings from these accompanying drawings without creative efforts.

DESCRIPTION OF EMBODIMENTS

Figure 1:
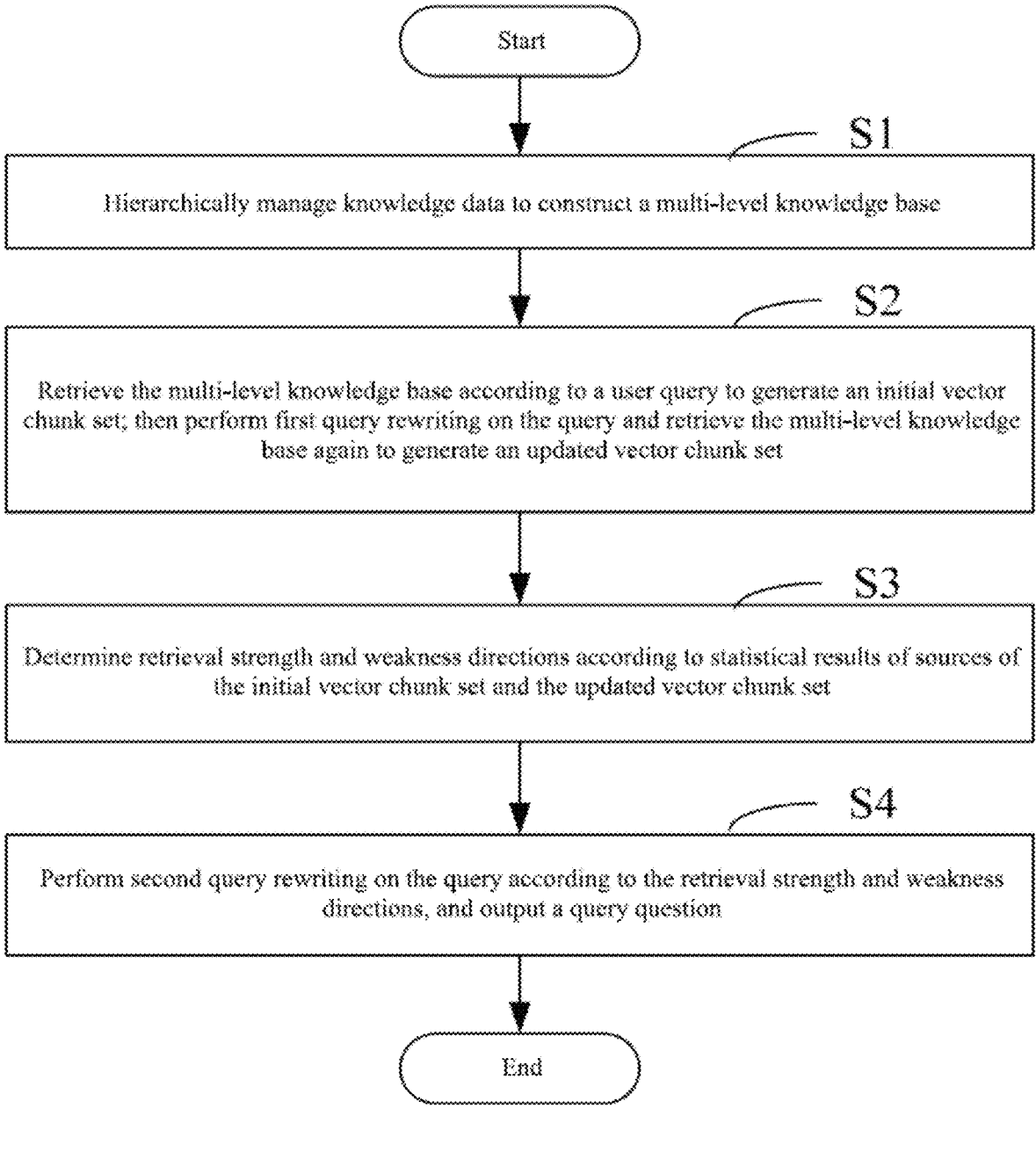
FIG. 1 is a flow chart of an embodiment of a retrieval optimization method according to the present application.

In the following descriptions, for illustration instead of limitation, specific details such as a particular system structure and a particular technology are provided for thorough understanding of embodiments of the present application. However, a person skilled in the art should know that the present application may also be implemented in other embodiments without these specific details. In other cases, detailed descriptions of well-known systems, apparatuses, circuits, and methods are omitted, so that the present application is described without being obscured by unnecessary details.

It should be understood that, when used in the specification and the appended claims of the present application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of the present application refers to any combination and all possible combinations of one or more associated listed items, and includes these combinations.

As used in the specification and the appended claims of the present application, according to the context, the term "if" may be interpreted as "when" or "once" or "in response to determining" or "in response to detecting". Similarly, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of the specification and claims of the present application, the terms "first", "second", "third", and the like are merely intended for a purpose of differentiated description, but shall not be understood as an indication or an implication of relative importance.

Reference to "an embodiment", "some embodiments", or the like described in the specification of the present application indicates that one or more embodiments of the present application include a specific feature, structure, or characteristic described with reference to the embodiments. Therefore, statements such as "in an embodiment", "in some embodiments", "in some other embodiments", and "in other embodiments" that appear at different places in this specification do not necessarily refer to a same embodiment. Instead, the statements mean "one or more but not all of embodiments", unless otherwise specifically emphasized in another manner. The terms "include", "comprise", and "have", and variants thereof all mean "include but are not limited to", unless otherwise specifically emphasized in another manner.

For ease of understanding, the technical solutions of the present application are described in detail below with reference to the accompanying drawings.

Figure 2:
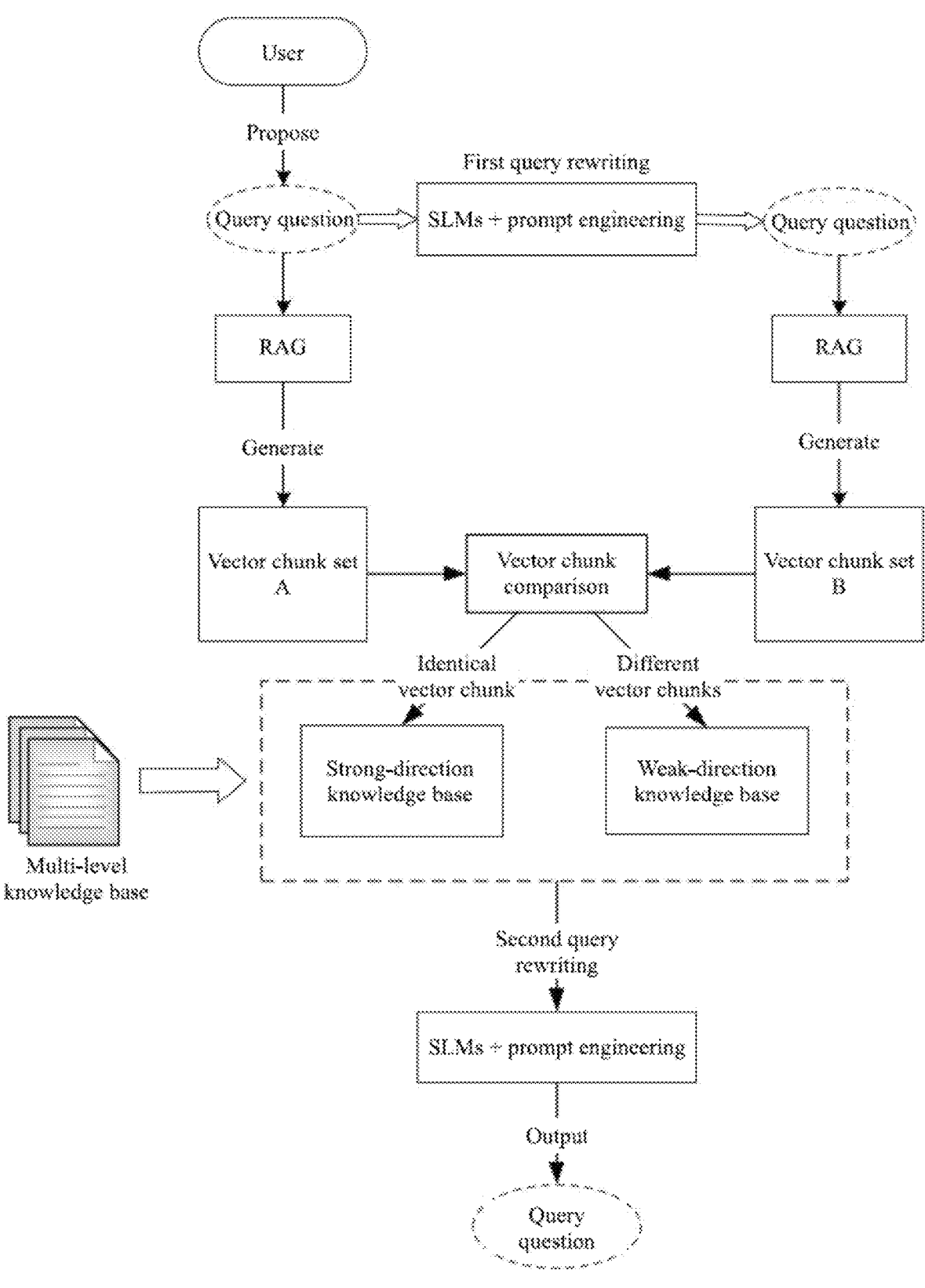
FIG. 2 is a flow chart of another embodiment of a retrieval optimization method according to the present application.

The present application provides a retrieval optimization method based on a multi-level knowledge base. As shown in FIGS. 1-2, for ease of description, only a part related to this embodiment is shown. The method provided in this embodiment includes the following steps:

S1: Knowledge data is hierarchically managed to construct a multi-level knowledge base.

Specifically, knowledge data may be hierarchically managed through scientific classification to ensure the independence and clarity of data sources, and divide the knowledge base into a plurality of levels, such as agriculture, medical care, education and other fields. Each level includes independent data sources to construct a multi-level knowledge base. For example, the knowledge base may be divided into 3 levels:

Level 1: Coarse: Main domain, i.e., broad categories, such as "Agriculture" or "Medical care";

Level 2: Fine: Sub-domains. For example, for "Agriculture," such as "Crop diseases" and "Fertilization"; for "Medical care," such as "Medical diagnosis"; and Level 3: Specific: Topics or questions. For example, for "Crop diseases," such as "Types of rice diseases"; for "Medical care," such as "Diabetes diagnosis methods".

It should be noted that the number and contents of the specific levels may be arbitrarily set according to the amount and range of the data contained in the knowledge base, the precision requirement of the problem index and the like, and the example is not limited thereto. There may or may not be a sub-level below each level. For example, the "Types of Rice Diseases" may include a sub-level, and the "Diabetes Diagnosis Methods" does not include a sub-level. That is, the relationships between levels may be symmetrically set or asymmetrically set, depending on the specific content and the classification of the knowledge base. More specifically, knowledge may be hierarchically stored based on predefined tags, so that data classification and index construction are achieved. The specific steps may optionally include:

S11: Clustering algorithm: automatically classifying unstructured text using a latent dirichlet alposition (LDA);

S12: Index construction: constructing an inverted index using Elasticsearch to support efficient retrieval; and S13: Dynamic update: regularly synchronizing new data sources and reconstructing an index using a real-time data update mechanism.

S2: The multi-level knowledge base is retrieved according to a user query to generate an initial vector chunk set; then first query rewriting is performed on the query and the multi-level knowledge base is retrieved again to generate an updated vector chunk set.

Specifically, after a user raises a query, an initial vector chunk set A may be generated based on a multi-level knowledge base established by retrieval-augmented generation (RAG) large language model. The query is then rewritten for the first time using a small language model and prompt engineering for zero-shot learning to preliminarily optimize the query and reduce colloquial expressions and ambiguity. The multi-level knowledge base is retrieved again to generate an updated vector chunk set B.

More specifically, a first rewriting algorithm may be as follows:

Input: An original query Q of a user.

Optimization rules: Prompt is designed and a query is rewritten for a specific task.

Example of Prompt:

The following user query is optimized to reduce ambiguity and more clearly express the information need: {Q}

Output: The optimized query Q' has a clearer structure and more explicit semantics.

Algorithm pseudocode:

```
from transformers import pipeline
model=pipeline ('text2text-generation', model='t5-small')
query="What are rice diseases?"
prompt=f"Optimize the following query to reduce ambiguity: {query}"
optimized_query=model(prompt)[0]['generated_text']
```

Generation and comparison of vector chunk sets A and B:

1. Method Description

After the first rewrite, the original query and the optimized query are retrieved respectively to generate the initial vector chunk set A and the updated vector chunk set B. Duplicate and independent sources are determined by comparing the knowledge base sources and the answer content of the vector chunk sets A and B.

2. Algorithm Implementation

The initial vector chunk set A and the updated vector chunk set B are generated, and vector retrieval technology is used to retrieve the most relevant knowledge base sources to save scores and answer content.

Algorithm pseudocode:

```
from sentence_transformers import SentenceTransformer, util
model=SentenceTransformer ('all-MiniLM-L6-v2')
embeddings_A={entry["source"]: model.encode(entry["content"]) for entry in data_A}
embeddings_B={entry["source"]: model.encode(entry["content"]) for entry in data_B}
repeated_sources=[ ]
for source_A, emb_A in embeddings_A.items( )
    for source_B, emb_B in embeddings_B.items( )
        if util.cos_sim(emb_A, emb_B)>0.85:
            repeated_sources.append((source_A, source_B))
```

S3: Retrieval strength and weakness directions are determined according to statistical results of sources of the initial vector chunk set and the updated vector chunk set.

Specifically, statistical comparison may be performed on the two generated results to determine which domain direction the current query is more inclined to. The domain with more relevant documents is the strong direction, and the domain with fewer relevant documents is the weak direction.

Preferably, the step S3 may include, but is not limited to:

S31: determining source positions of vector chunks from the initial vector chunk set and the updated vector chunk set in the multi-level knowledge base;

S32: counting a number of vector chunks included at the source positions; and

S33: sorting statistical results to determine the retrieval strength and weakness directions.

Specifically, the specific source position of each vector chunk element in the initial vector chunk set and the updated vector chunk set in the multi-level knowledge base constructed in step S1 is identified to identify the repeated and independent knowledge base sources, so as to determine the retrieval strength and weakness directions.

Figure 3:
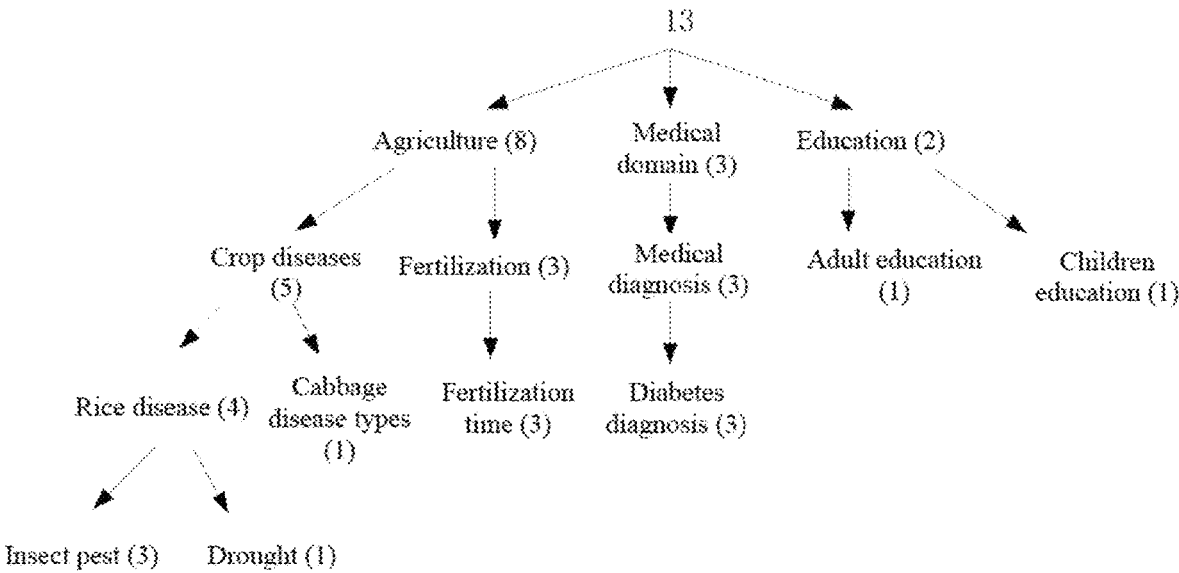
FIG. 3 is a schematic diagram of an embodiment of a multi-level knowledge base according to the present application.

Also taking the foregoing domains of agriculture, medical care and education as an example, it is assumed that there are K retrieval results in the initial vector chunk set A and the updated vector chunk set B, that is, the initial vector chunk set A includes relevant documents ($K_{a1}$ $K_{a2}$ ... $K_{aa}$) related to the query question; the updated vector chunk set B includes relevant documents ($K_{b1}$ $K_{b2}$ ... $K_{bb}$) related to the query question, then the position of each relevant document in the multi-level data chunk is determined, and the number of vector chunks included at each position is counted. More specifically, a tree structure may be constructed for clear display, as shown in FIG. 3. Taking K=13 as an example, it is assumed there are 13 relevant documents, in a first-level large domain, 8 documents come from agriculture, 3 documents come from medical care, and 2 documents come from education; in a second-level sub-domain, among the 8 documents coming from agriculture, 5 documents come from crop diseases and 3 documents come from fertilization; among the 3 documents coming from medical care, 3 all come from diabetes diagnosis; among the 2 documents coming from education, 1 comes from adult education and 1 comes from children education; in a third-level sub-domain, among the 5 documents coming from crop diseases, 4 come from rice disease types and 1 comes from cabbage disease types; among the 3 documents coming from fertilization, 3 all come from fertilization time; among the 3 documents coming from medical diagnosis, 3 all come from diabetes diagnosis; and in a fourth-level sub-domain, among the 3 documents coming from rice diseases, 3 come from insect pests and 1 comes from drought. It should be noted that, in the actual retrieval generation, the number K of relevant documents retrieved by the target may be tens of thousands or even more, and the domain differences of the target documents may not be very large. Most of relevant documents are concentrated in a large domain or even a specific question. Depending on the query questions and related prompts, the relevant documents may be inclined to a certain domain or a certain question, which is not balanced as shown in FIG. 3. FIG. 3 is only an example, and is not limited thereto.

In addition, the source positions of vector chunks in the updated vector chunk set B may also be determined. According to the source positions of the 2K vector chunks in the two vector chunk sets, statistics and sorting are performed to determine the strong and weak directions of the retrieval from top to bottom. The knowledge bases from which the vector chunks are repeatedly and identically derived are determined as strong directions, while the knowledge bases from which the vector chunks are scattered and independently derived are determined as weak directions.

Preferably, the step S33 may include, but is not limited to:

S331: determining a position coefficient at each of the source positions according to the number of vector chunks included at the source positions; and S332: if the position coefficient is greater than a first set threshold or a ranking of the position coefficient is within a first set rank, determining the position coefficient as a strong retrieval direction; otherwise, determining the position coefficient as a weak retrieval direction.

In this embodiment, a preferred embodiment of how to sort and determine the strong and weak directions of the retrieval in the step S33 is provided. Of course, there are many other ways to sort and determine the strong and weak directions. As long as the sorting is based on the statistical results, any method of determining the strong and weak directions is acceptable. It is not necessary to calculate the position coefficient of each position, and it is also optional to sort directly according to the number of statistical vector chunks.

More preferably, the step S332 may further include, but is not limited to:

determining whether a position coefficient at a source position determined to be in the weak direction is less than a second set threshold or whether a ranking of the position coefficient is greater than a second set rank, if yes, screening out a source position corresponding to the position coefficient; where the second set threshold is less than the first set threshold; and the second set rank is greater than the first set rank.

In this embodiment, a further preferred embodiment of the step S332 is provided, which screens out directions with particularly small position coefficients or particularly low rankings, and may delete weak directions with particularly few relevant documents. This avoids some relevant documents that are mistakenly entered and actually irrelevant, further improves the efficiency and accuracy of subsequent retrieval generation. Such particularly weak directions are not included in the database that needs to be retrieved subsequently.

More preferably, the step S31 further includes:

S31$a$: comparing the initial vector chunk set with the updated vector chunk set to determine an identical vector chunk and different vector chunks;

S31$b$: configuring a higher number coefficient for the identical vector chunk than for the different vector chunks;

the step S32 specifically includes: counting a number of vector chunks included in the source positions based on a weight according to the number coefficient.

In this embodiment, a preferred embodiment of the steps S31 and S32 is provided, which first compares the relevant documents $(K_{a1} K_{a2} \ldots K_{aa})$ and $(K_{b1} K_{b2} \ldots K_{bb})$ in the initial vector chunk set A and the updated vector chunk set B to determine whether there are identical vector chunks, and configures a higher number coefficient for the identical vector chunks than for different vector chunks. That is to say, an identical vector chunk occupies a higher weight than a different vector chunk when the number is counted. For example, taking the number coefficient of the identical vector chunk as 1 and the number coefficient of the different vector chunk as 0.5 as an example, 5 relevant documents are counted for crop diseases. If, when compared with the updated vector chunk set B, 2 vector chunks are identical and 3 vector chunks are different, then after the number coefficient is updated according to the weight during statistics, the relevant documents for crop disease statistics should be updated to $2 \times 1 + 3 \times 0.5 = 3.5$. Based on this preferred embodiment, the retrieval efficiency and accuracy may be more effectively improved, because if a relevant document is hit repeatedly in two retrievals, this relevant document must be a document with very high relevance. A higher number coefficient is configured for this document when the number is counted, so that the relevance degree of the relevant document may be more fully embodied.

More preferably, the step S331 may include, but is not limited to:

S3311: in the multi-level knowledge base, determining a position coefficient at each of the source positions on a first level according to a number of vector chunks included at the source positions on the first level; and S3312: for each of source positions at a level other than the first level, determining a position coefficient at the source position at the level other than the first level according to a number of vector chunks included at the source position and position coefficients of superior levels of the source position.

In this embodiment, a preferred embodiment of the step S331 is provided, which is also illustrated using FIG. 3 as an example. For each of source positions at the first level, such as agriculture, the position coefficient at this position may be directly determined based on the number of vector chunks included at this position. Optionally, the number of vector chunks may be represented as 8, or the proportion of the vector chunks may be represented as 8/12. For each of source positions at a level other than the first level, such as rice disease, the position coefficient at this position may be determined based on the number of vector chunks included at this position and position coefficients of superior levels of the source position. Optionally, the number of vector chunks is represented as 8+5+4=17, or the proportion of vector chunks is represented as 8/12+5/12+4/12.

In this embodiment, a preferred embodiment of the step S331 is provided. For each of source positions at a level other than the first level, the number of vector chunks counted at this source position and the number of vector chunks counted at superior levels of the source position are comprehensively considered, and the position coefficients of the source positions are then sorted to determine the strong and weak directions of the retrieval, which can more accurately express the strength and weakness of each source position. For example, as shown in FIG. 3, the number of vector chunks at the source positions of rice disease is 4, the number of vector chunks at the two source positions of fertilization time and diabetes diagnosis is 3. It is set that the number of vector chunks at the superior-level medical domain, medical diagnosis sub-domain, and inferior-level insect pests are also 3. If only the number of vector chunks at their own positions is considered, the strength and weakness degrees are the same. However, it may be seen from the example shown in FIG. 3 that the strength and weakness degree of the agricultural domain is significantly stronger than that of the medical domain. According to the steps S3311-S3321, the number of vector chunks at their own positions and the number of vector chunks of all their superior levels may be comprehensively considered. Then, the position coefficient of rice disease is 17, the position coefficient of fertilization time is 14, and the position coefficient of diabetes diagnosis is 9. The strength and weakness directions may be sorted and determined as rice disease>fertilization time>diabetes diagnosis. The determination of the strength and weakness directions is significantly more accurate, especially for thousands of large data. The advantage is more significant.

More preferably, the step S3312 may further include, but is not limited to:

S33121: for the source position at the level other than the first level, counting a sum of a number of vector chunks included in the same level;

S33122: determining a level coefficient at the source position according to a ratio of the number of vector chunks included at the source position to the sum of the number of vector chunks included at the same level; and S33123: determining the position coefficient at the source position at the level other than the first level according to the number of vector chunks included in the source position and the position coefficients of superior levels of the source position as well as the level coefficient at the source position.

In this embodiment, a preferred embodiment of the step S3312 is provided. For each of source positions at a level other than the first level, the position coefficient of this source position is comprehensively considered according to the number of vector chunks included in the source position and the position coefficients of superior levels of the source position as well as the level coefficient at the source position, and the position coefficients of the source positions are then sorted to determine the strong and weak directions of the retrieval, which can further more accurately express the strength and weakness degrees of the source positions. For example, as shown in FIG. 3, the education domain includes two documents: one for adult education and one for children education in the second level, and there is no third level. When the position coefficients of source positions in the third level are counted, it is clearly unreasonable to still use the total 13 vector chunks as the basis for calculating the position coefficients. To more accurately represent the position coefficients of the positions, the present application recounts the total number of vector chunks included in each level except the first level. As shown in the steps S33121-S33123, the position coefficient for rice disease should be changed from 8+5+4=17 to 8+(5/13)×5+(3/11)×3. 11 refers to a sum of all vector blocks in the third level, that is, 4+1+3+3=11; 12 refers to a sum of all vector blocks in the second level, that is, 5+3+3+1+1=13 5/13, 5/13 represents the weight of the item in this level (5 refers to the number of items in this level, 13 refers to the total number in this level, 5/13 represents the weight), and then ×5 is the number of vector blocks of the item in this level; 3/12 and ×3 are the same. This effectively avoids situations where a level has no sub-levels, further improving the accuracy of the position coefficient representation and the precision of retrieval generation. Similarly, for tens of thousands of large data, the present application has significant advantages.

S4: Second query rewriting is performed on the query according to the retrieval strength and weakness directions, and a query question is output.

Specifically, similar to the step S2, based on the determined strong and weak directions of the retrieval, the query may be rewritten for the second time using a small language model or a zero-sample prompting project to further output a more accurate query question.

1. Method Description

Based on the weighted knowledge base, the generated query questions are biased towards high-weight sources, while retaining information from low-weight sources.

2. Algorithm Implementation

Input: Optimized query Q".

Optimization rule: Prompt is designed to limit the scope.

For the following query, professional answers are generated from high-weight knowledge bases and integrated with low-weight sources: {Q"}

Output: Final optimized query Q'"

Pseudocode:

prompt=f"Optimize the following query based on the source of the knowledge base: {optimized_query}"

final_query=model(prompt)[0]['generated_text']

According to the retrieval optimization method based on the multi-level knowledge base provided by the present application, the initial vector chunk sets and the updated vector chunk sets of the two retrievals are counted, duplicate and independent knowledge bases are identified, the retrieval strength and weakness directions are determined, the second query rewriting is performed on the query, and more accurate query questions are output. In one aspect, for the strong direction determined by the retrieval, it is determined which knowledge base the retrieval result repeatedly comes from, not all the knowledge bases are treated uniformly, and the specialty of the query question may be considered. In another aspect, for the weak direction determined by the retrieval, it is determined which knowledge base the retrieval result comes from independently, rather than discarding the retrieval result directly, and the comprehensiveness of the query question may be considered. Therefore, the strong and weak direction positioning of the retrieval preferably adjusts the focus of the retrieval and the weight of the knowledge base, which can generate query questions that are both professional and comprehensive.

Through two rounds of optimization, this method significantly reduces query ambiguity and enhances the accuracy and diversity of generated content, providing a more efficient and accurate solution for the application of RAG systems in complex tasks.

In summary, it is particularly important to improve the performance of the retrieval-augmented generation (RAG) system when facing the common problems of colloquialism, omission, ambiguity and context dependence in user queries. To this end, the present application proposes an optimization framework based on two-round query rewriting to improve the query understanding and generation quality of the RAG system. First, a multi-level knowledge base architecture is constructed. For example, the data is divided into three levels according to domains, sub-domains and specific topics through scientific classification methods to ensure that each module within the knowledge base is independent of each other and the data source is clear. This hierarchical structure helps to accurately match user queries with relevant knowledge base content, improving the accuracy and controllability of retrieval. In the first-round query rewriting, the RAG system generates a corresponding initial vector chunk set A based on the query question raised by the user. The initial query of the user is then rewritten using small language models (SLMs) combined with a prompt engineering technology, so that the ambiguity in the query is eliminated, and the expression of the query is optimized. Subsequently, based on the user query, an updated vector chunk set B is generated by the RAG system. In the second-round optimization, the initial vector chunk set A and the updated vector chunk set B are compared. The knowledge base corresponding to the more vector chunks is determined as a strong direction, and the knowledge base corresponding to the fewer vector chunks is determined as a weak direction. More preferably, the strong-direction knowledge base and the weak-direction knowledge base may be weighted, for example: strong: weak=4:1, or weighted in sequence according to ranking. This weighting strategy helps guide the query generation process to pay more attention to the professionalism and indicativeness of the high-weight knowledge base content, and meanwhile, the diversity and the comprehensiveness of the content of the low-weight knowledge base are considered. Finally, based on these knowledge bases and combined with prompt engineering technology, the query question is rewritten for the second time to generate the final query question, making this question more professional and comprehensive while fully including the user's intention. The generated query question optimizes expression and depth according to the weighting information of each knowledge base, and the generation quality and efficiency of the system are improved.

In another aspect, the retrieval optimization method may be further applied to retrieval generation, and includes the following steps:

P1: optimizing the query question by adopting the foregoing retrieval optimization method;

P2: determining a weight of the multi-level knowledge base according to the retrieval strength and weakness directions determined in any of the retrieval optimization methods; and P3: generating a final vector chunk set according to the optimized query question and the multi-level knowledge base set by the weight.

Specifically, in the comparison results, duplicate sources are given high weights, and independent sources are given low weights (the default ratio is 4:1);

2. Algorithm Implementation

Weight formula: Repeat source weight W_r=0.8; independent source weight W_i=0.2.

The comprehensive score of each source in dataset C is calculated based on the weight:

$$ScoreC = W \cdot Original\_Score$$

Algorithm pseudocode:

```
data_C=[ ]
for source in repeated_sources:
    data_C.append({"source": source, "weight": 0.8,
        "score": original_score[source]*0.8})
for source in independent_sources:
    data_C.append({"source": source, "weight": 0.2,
        "score": original_score[source]*0.2})
data_C=sorted(data_C, key=lambda x: x['score'],
    reverse=True)
```

Figure 4:
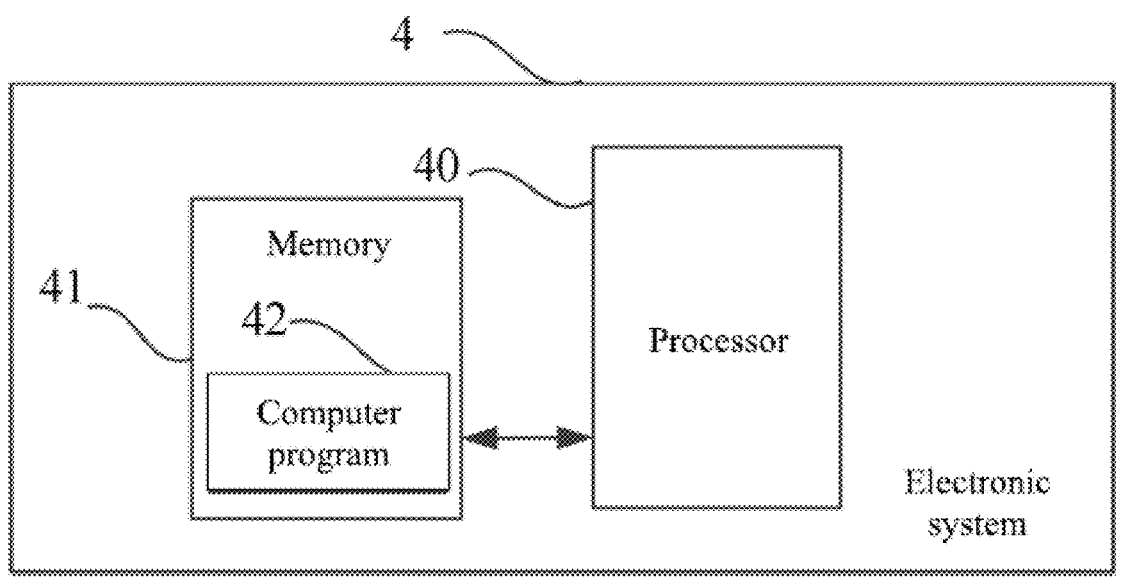
FIG. 4 is a schematic structural diagram of an embodiment of an electronic system according to the present application.

In another aspect, FIG. 4 is a schematic structural diagram of an electronic system according to the present application. As shown in FIG. 4, the electronic system 4 in this embodiment includes: at least one processor 40 (only one is shown in FIG. 4), a memory 41, and a computer program 42 stored in the memory 41 and executable on the at least one processor 40. When the processor 40 executes the computer program 42, the steps in the method embodiment of FIG. 3 are implemented, or the functions of the modules/units in the apparatus embodiment of FIG. 3 are implemented.

The electronic system 4 may be a computing device such as a desktop computer, a notebook computer, a palmtop computer, or a cloud server. The electronic system 4 may include but is not limited to the processor 40 and the memory 41. Those skilled in the art may understand that FIG. 4 is merely an example of the electronic system 4, and does not constitute a limitation on the electronic system 4. The electronic system may include more or fewer components than those shown in the figure, or may combine some components, or may have different components. For example, the electronic system may further include an input/output device or a network access device.

The processor 40 may be a central processing unit (CPU). The processor 40 may alternatively be another general-purpose processor, a digital signal processor (DSP), an application specific integrated circuit (ASIC), a field-programmable gate array (FPGA) or another programmable logic device, a discrete gate, a transistor logic device, a discrete hardware component, or the like. The general-purpose processor may be a microprocessor, or the processor may be any conventional processor, or the like.

In some embodiments, the memory 41 may be an internal storage unit of the electronic system 4, such as a hard disk or memory of the electronic system 4. In some embodiment, the memory 41 may alternatively be an external storage device of the electronic system 4, for example, a plug-in hard disk, a smart media card (SMC), a secure digital (SD) card, or a flash card that is disposed on the electronic system 4. Further, the memory 41 may include both an internal storage unit and an external storage device of the electronic system 4. The memory 41 is used to store an operating system, application programs, a boot loader, data, and other programs, such as program codes of computer programs. The memory 41 may further be configured to temporarily store data that has been output or is to be output.

In another aspect, an embodiment further provides a computer-readable storage medium having a computer program stored thereon. When the computer program is executed by a processor, the steps of the foregoing method embodiments may be implemented.

When the integrated unit is implemented in the form of a software functional unit and sold or used as an independent product, the integrated unit may be stored in a computer-readable storage medium. Based on such an understanding, all or some of the procedures of the method in the embodiments of the present application may be implemented by a computer program instructing relevant hardware. The computer program may be stored in a computer-readable storage medium. When the computer program is executed by a processor, the steps in the foregoing method embodiments may be implemented. The computer program includes computer program code. The computer program code may be in a source code form, an object code form, an executable file form, some intermediate forms, or the like. The computer-readable medium may include at least any entity or apparatus that can carry computer program code to the electronic system, a recording medium, a computer memory, a read-only memory (ROM), a random access memory (RAM), an electrical carrier signal, a telecommunication signal, and a software distribution medium, for example, a USB flash drive, a removable hard disk, a magnetic disk, or an optical disc.

In the foregoing embodiments, the description of each embodiment has respective focuses. For a part that is not described in detail or recorded in an embodiment, refer to related descriptions in other embodiments.

Those of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. Those skilled in the art may use different methods to implement the described functions for each particular application, but it should not be considered that the implementation goes beyond the scope of the present application.

In the embodiments provided in the present application, it should be understood that the disclosed apparatus/device and method may be implemented in other manners. For example, the described apparatus/device embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

The foregoing electronic system and storage medium are created based on the foregoing retrieval optimization method, which are not described in detail herein. The foregoing embodiments are merely used to describe the technical solutions of the present application, but are not intended to limit the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application, all of which shall fall within the protection scope of the present application.

What is claimed is:

1. A retrieval optimization method based on a multi-level knowledge base, comprising:

S1: hierarchically managing knowledge data to construct a multi-level knowledge base;

S2: retrieving the multi-level knowledge base according to a user query to generate an initial vector chunk set; then performing first query rewriting on the query and retrieving the multi-level knowledge base again to generate an updated vector chunk set;

S3: determining retrieval strength and weakness directions according to statistical results of sources of the initial vector chunk set and the updated vector chunk set in a multi-level data chunk;

S4: performing second query rewriting on the query according to the retrieval strength and weakness directions, and outputting a query question; wherein the step S3 comprises:

S31: determining source positions of vector chunks from the initial vector chunk set and the updated vector chunk set in the multi-level knowledge base;

S32: counting a number of vector chunks comprised at the source positions;

S33: sorting statistical results to determine the retrieval strength and weakness directions;

the step S33 comprises:

S331: determining a position coefficient at each of the source positions according to the number of vector chunks comprised at the source positions;

S332: if the position coefficient is greater than a first set threshold or a ranking of the position coefficient is within a first set rank, determining the position coefficient as a strong retrieval direction; otherwise, determining the position coefficient as a weak retrieval direction; and the step S332 further comprises:

determining whether a position coefficient at a source position determined to be in the weak direction is less than a second set threshold or whether a ranking of the position coefficient is greater than a second set rank, if yes, screening out a source position corresponding to the position coefficient; wherein the second set threshold is less than the first set threshold; and the second set rank is greater than the first set rank.

2. The retrieval optimization method according to claim 1, wherein the step S31 further comprises:

S31$a$: comparing the initial vector chunk set with the updated vector chunk set to determine an identical vector chunk and different vector chunks;

S31$b$: configuring a higher number coefficient for the identical vector chunk than for the different vector chunks; and the step S32 specifically comprises: counting a number of vector chunks comprised in the source positions based on a weight according to the number coefficient.

3. The retrieval optimization method according to claim 2, wherein the step S331 comprises:

S3311: in the multi-level knowledge base, determining a position coefficient at each of the source positions on a first level according to a number of vector chunks comprised at the source positions on the first level; and S3312: for each of source positions at a level other than the first level, determining a position coefficient at the source position at the level other than the first level according to a number of vector chunks comprised at the source position and position coefficients of superior levels of the source position.

4. The retrieval optimization method according to claim 3, wherein the step S3312 further comprises:

S33121: for the source position at the level other than the first level, counting a sum of a number of vector chunks comprised in the same level;

S33122: determining a level coefficient at the source position according to a ratio of the number of vector chunks comprised at the source position to the sum of the number of vector chunks comprised at the same level; and S33123: determining the position coefficient at the source position at the level other than the first level according to the number of vector chunks comprised in the source position and the position coefficients of superior levels of the source position as well as the level coefficient at the source position.

5. The retrieval optimization method according to claim 1, comprising:

P1: optimizing the query question by adopting the retrieval optimization method;

P2: determining a weight of the multi-level knowledge base according to the retrieval strength and weakness directions determined in the retrieval optimization method; and P3: generating a final vector chunk set according to the optimized query question and the multi-level knowledge base set by the weight.

6. A computer-readable storage medium, wherein the computer-readable storage medium stores a computer program, and when the computer program is executed by a processor, the method according to claim 1 is implemented.

7. An electronic system, comprising: a memory, a processor, and a computer program that is stored in the memory and that can be run on the processor, wherein when executing the computer program, the processor implements the method according to claim 1.

* * * * *